United States Patent [19]

Garner et al.

[11] Patent Number: 4,466,621
[45] Date of Patent: Aug. 21, 1984

[54] ROTARY DRILL BIT MULTIPLE SEAL ASSEMBLY

[75] Inventors: Lloyd L. Garner, Ft. Worth; Samuel R. Westfall, Hurst; Dwight A. Rife, Ft. Worth, all of Tex.

[73] Assignee: Rock Bit Industries U.S.A., Inc., Fort Worth, Tex.

[21] Appl. No.: 445,053

[22] Filed: Nov. 29, 1982

[51] Int. Cl.³ .................... F16J 15/24; F16J 15/38
[52] U.S. Cl. .................................. 277/84; 277/92; 277/95; 277/165; 277/DIG. 6
[58] Field of Search ............... 277/83, 84, 92, 95, 277/96, 96.1, DIG. 6, 96.2, 165, 173, 177, 186, 188 R, 188 A

[56] References Cited

U.S. PATENT DOCUMENTS

| | | | |
|---|---|---|---|
| 2,789,847 | 4/1957 | Jackson | 277/84 |
| 3,057,630 | 10/1962 | Sneed | 277/165 |
| 3,397,928 | 8/1968 | Galle | 277/84 X |
| 3,656,764 | 4/1972 | Robinson | 277/92 |
| 3,862,762 | 1/1975 | Millsap | 277/92 |
| 3,944,306 | 3/1976 | Neilson | 277/95 X |
| 4,057,257 | 11/1977 | Berg | 277/165 X |
| 4,176,848 | 12/1979 | Lafuze | 277/92 |

*Primary Examiner*—Robert S. Ward
*Attorney, Agent, or Firm*—Hubbard, Thurman, Turner & Tucker

[57] ABSTRACT

An improved seal assembly for utilization with earth boring drilling bits employing roller cutters. The improved seal is constructed utilizing two resilient O-rings or other resilient seals engaging opposing surfaces in the roller cutter and the corner formed by the shaft and face of the cutter support. The O-rings are mounted in and separated by a flexible floating ring of slightly harder material than the O-ring material. The flexible floating ring may be coated with or made from a material which provides a low coefficient of friction, permitting the O-rings to rotate therein. In an alternate embodiment of the present invention the flexible floating ring is tapered so that increased loading of the earth boring drilling bit will result in increased compression of the resilient O-rings, thus improving the seal under high load conditions. The improved seal of the present invention will accommodate substantial radial, axial and angular displacements of the roller cutter while satisfactorily inhibiting the ingress of detritus and the egress of lubricant.

22 Claims, 4 Drawing Figures

ROTARY DRILL BIT MULTIPLE SEAL ASSEMBLY

BACKGROUND OF THE INVENTION

This invention relates in general to improved seal means for drill bit bearings and in particular to seal means which demonstrate improved accommodation for axial, radial and angular displacements of the roller cutter.

Earth boring drill bits, such as are typically employed in the petrochemical industry for drilling oil or gas wells, are rugged pieces of equipment which must operate in very severe environments. In such operations, a drill bit is typically threaded onto a section of pipe and lowered into a well bore wherein it is rotated for the purpose of cutting through rock and earth formations. Rotatable cutters are usually mounted on a shaftlike cutter support and the fragments of rock created by the operation of the rolling cutters are removed from the well bore utilizing a drilling fluid or "mud" solution. In prior art drill bit bearings, several solutions have been proposed to inhibit the ingress of abrasive detritus into the bearings of the roller cutter thereby permitting the roller cutter to be operated over extended periods of time in this environment. One such solution to this problem has been the utilization of pressurized lubricant reservoirs which are operated by the pressures of the drilling fluid within the well bore and serve to equalize the pressure of the lubricant being forced onto the bearing surfaces. This pressurized lubricant reservoir has been moderately successful in preventing the ingress of abrasive detritus into the bearing area; however, the pressurized lubricant reservoir does result in the egress of lubricant from the bearing area in greater amounts than is normally experienced.

Another approach to the problem of preventing abrasive material from wearing away at the bearing surface has been the utilization of various packing ring sealing apparatus. An early example of this approach may be seen in U.S. Pat. No. 3,397,928, issued to Edward M. Galle, which utilizes the simple expedient of an elastomeric sealing ring which has been compressed between the inner face between the roller cutter shaft. Another example of a packing ring seal utilized in rotary drill bits may be seen in U.S. Pat. No. 3,656,764, issued to William P. Robinson. The Robinson drill bit seal assembly utilizes two elastomeric O-ring seals which are separated by a rigid ring which is utilized to seat the O-rings into opposing bearing surfaces. This utilization of a rigid ring, while providing an increase in accommodation of radial, axial and angular displacements over previously known O-ring seals, is still limited in the amount of such displacement which may be accommodated.

Each of these sealing mechanisms and pressurized lubrication systems is designed to prevent the ingress of abrasive detritus into the bearings supporting the roller cutters. This is necessary since it is most desirable to operate the drill bit for long periods of time between drill bit changes, due to the amount of manpower and time required to remove the drill stem from the well bore to replace the drill bit. Complicating this problem is the fact that the fluctuations in position and pressure which are encountered by an earth boring drill bit during operation are substantial and tend to displace the roller cutter from the shaft upon which it is mounted. These displacements from normal mounting position increase as the bearing surface is worn and it is most desirable to utilize a sealing mechanism which can accommodate these increasing fluctuations in position without deteriorating to the point where abrasive material may enter the bearing surface or undue amounts of lubricant are lost.

SUMMARY OF THE INVENTION

Therefore, it is one object of the present invention to provide an improved rotary seal for use in earth boring drilling bits.

It is another object of the present invention to provide an improved rotary seal for use in earth boring drilling bits which can accommodate a wide variation in radial, axial and angular displacement of the roller cutter.

It is yet another object of the present invention to provide an improved rotary seal for use in earth boring drilling bits which is relatively impervious to the abrasive character of drilling fluids and detritus.

It is another object of the present invention to provide an improved rotary seal for use in earth boring drilling bits which provides increased effectiveness over known resilient packing ring seals in drill bit bearings by combining the advantages of both shaft seals and face seals.

The foregoing objects are achieved as is now described. The improved seal is constructed utilizing two resilient O-rings or other resilient seals engaging opposing surfaces in the roller cutter and the corner formed by the shaft and face of the cutter support. The O-rings are mounted in and separated by a flexible floating ring of slightly harder material than the O-ring material. The flexible floating ring may be coated with or made from a material which provides a low coefficient of friction, permitting the O-rings to rotate therein. In an alternate embodiment of the present invention the flexible floating ring is tapered so that increased loading of the earth boring drilling bit will result in increased compression of the resilient O-rings, thus improving the seal under high load conditions. The improved seal of the present invention will accommodate substantial radial, axial and angular displacements of the roller cutter while satisfactorily inhibiting the ingress of detritus and the egress of lubricant.

BRIEF DESCRIPTION OF THE DRAWINGS

The novel features believed characteristic of the invention are set forth in the appended claims. The invention itself; however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
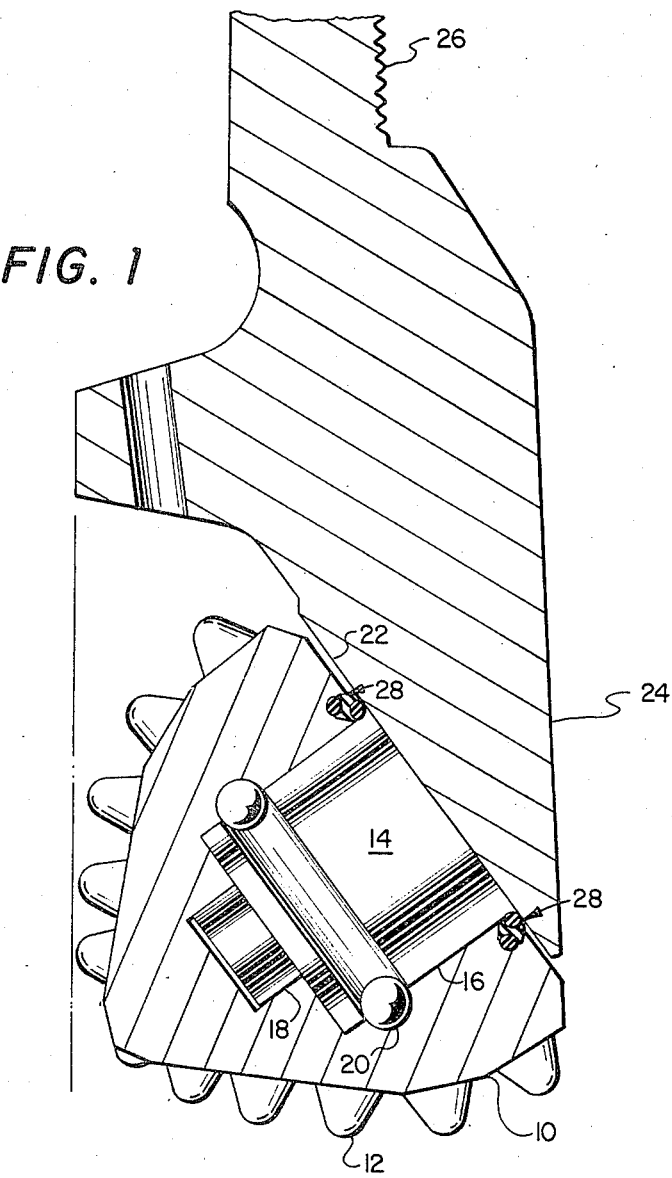
FIG. 1 is a longitudinal sectional view through a drill bit roller cutter together with its associated bearing shaft and support which illustrates the improved seal of the present invention.

With reference now to the figures and in particular with reference to FIG. 1, there is depicted a longitudinal sectional view through a drill bit roller cutter together with its associated bearing shaft and support which illustrates the improved seal of the present invention. Roller cutter 10 is depicted as including a plurality of cutting inserts such as 12, which may be constructed of tungsten carbide or any other material known in the art. As is typical in this art, roller cutter 10 is mounted on a shaft 14 by means of friction bearings 16 and 18 and ball bearings 20. Shaft 14 is formed on face surface 22 of cutter support 24. Cutter support 24 includes a threaded portion 26 which is utilized for connection to a drill stem (not shown) in the manner typical in this art. Not depicted in FIG. 1, but present in all such drill bit systems is a lubrication system, which may or may not be pressurized, which serves to lubricate the bearing surfaces upon which roller cutter 10 is mounted. It is the egress of this lubricant and the ingress of detritus and drilling fluid which must be inhibited to promote increased operation of such drill bits. To this end, seal 28 is disposed between the lubricated bearing surfaces and the abrasive particles in the environment of the well bore.

Figure 2:
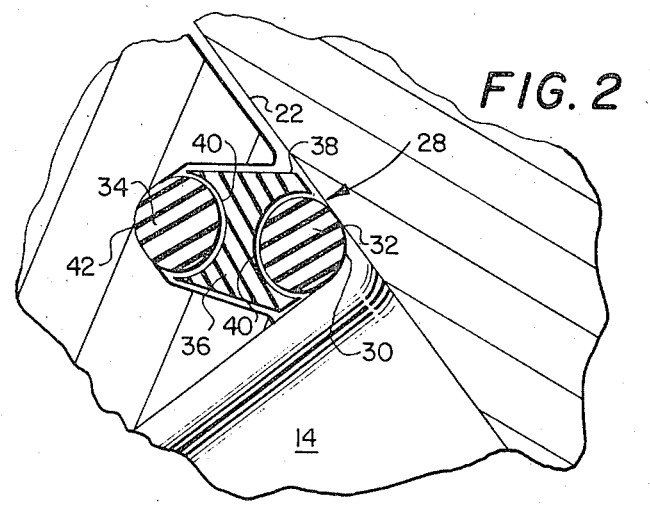
FIG. 2 is a large scale sectional view of the improved seal of the present invention.

Referring now to FIG. 2, there is depicted a larger scale drawing of seal 28 which is useful in disclosing the construction and operation of the novel seal of the present invention.

Known packing ring seals in the prior art fall generally into two categories. First, a so-called "shaft" seal which is disposed in the concave portion of the roller cutter or on the surface of the support shaft and compressed therein. "Shaft" seals are compressed radially with respect to the shaft and provide reasonable accommodation to axial displacements of roller cutter 10.

The second category of packing ring seals is the so-called "face" seal wherein the seal ring is disposed on the face of the cutter support and is compressed between the face surface of the cutter support and the surface of the roller cutter. "Face" seals provide a reasonable accommodation to radial displacement of roller cutter 10 to the limits of compression and expansion of the seal ring material.

Seal 28 of the present invention is a hybrid form of seal which combines the advantages of "shaft" seals with the advantages of "face" seals. Seal 28 is comprised of a first bearing surface 30 which is formed at the intersection of shaft 14 and face surface 22 and which is disposed circumferentially about the base of shaft 14. A second bearing surface 42 is machined into roller cutter 10 at a point opposing bearing surface 30 so tha a line joining bearing surface 30 and bearing surface 42 will substantially bisect the angle between shaft 14 and face surface 22.

Mounted in compressed engagement with bearing surfaces 30 and 42 respectively are elastomeric compressible O-rings 32 and 34. O-rings 32 and 34 may be constructed of butadiene acrylonitrile (Buna N) rubber in suitable sizes and dimensions to be utilized in various applications and may be compressed. In a preferred embodiment of the present invention, O-rings 32 and 34 are constructed of a material having a durometer hardness of approximately eighty, although variations in hardness may be appropriate for alternate applications in either of the rings.

O-rings 32 and 34 are mounted in engagement with bearing surfaces 30 and 42 and maintained in the depicted engagement by means of flexible floating ring 36. Flexible floating ring 36 is constructed of a resilient flexible material such as polyurethane, neoprene, high carbon rubber or Buna N rubber and preferably exhibits a durometer hardness of approximately ninety or greater. Floating ring 36 is utilized to maintain a compression of approximately nine percent on O-rings 32 and 34 and the compression may increase to approximately fourteen percent under loading conditions.

In two alternate embodiments of the present invention, flexible floating ring 36 may include an outer surface 38 which is coated with a less hard material exhibiting a durometer hardness of approximately seventy percent to improve the resistance of flexible floating ring 36 to the abrasive character of the material in the well bore. Secondly, flexible floating ring 36 may include at least two surface areas 40 which may be coated with a low coefficient of friction material such as a hard polymerized tetrafluoro-ethylene plastic. Such a material is marketed under the name Teflon by the E. I. DuPont Company. The coating of flexible floating ring 36 with a low coefficient of friction material will greatly enhance the rotational movement of either O-ring 32 or O-ring 34 and render such movement independent of the movement of the other O-ring. Those skilled in the art will appreciate, upon reference to this specification, that the utilization of a resilient floating ring as a mounting point for O-rings 32 and 34 and the hybrid location of seal 28 will greatly enhance the ability of seal 28 to accommodate radial, axial and angular displacements of roller cutter 10 without substantially increasing the ingress of detritus of the egress of lubrication in the bearing area.

Figure 3:
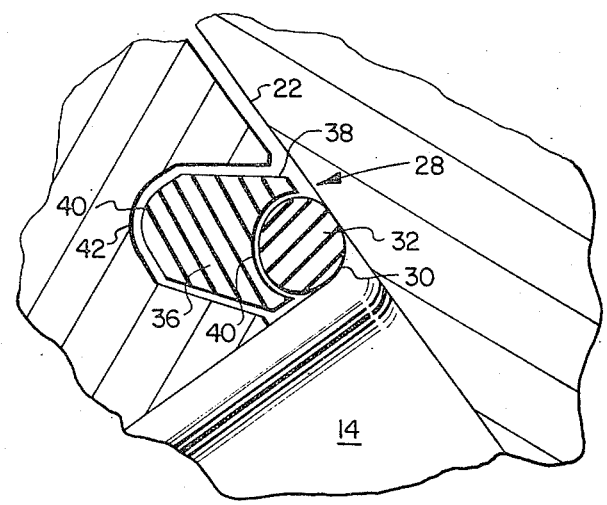
FIG. 3 is a large scale sectional view of an alternate embodiment of the improved seal of the present invention.

Referring now to FIG. 3, there is depicted a larger scale drawing of an alternate embodiment of seal 28 which is useful in disclosing the construction and operation of this alternate embodiment of the novel seal of the present invention. Where possible the same reference numerals are utilized to describe this embodiment of seal 28.

Seal 28 of FIG. 3 is another hybrid form of seal which combines the advantages of "shaft" seals with the advantages of "face" seals. Seal 28 is comprised of a first bearing surface 30 which is formed at the intersection of shaft 14 and face surface 22 and which is disposed circumferentially about the base of shaft 14. A second bearing surface 42 is machined into roller cutter 10 at a point opposing bearing surface 30 so that a line joining bearing surface 30 and bearing surface 42 will substantially bisect the angle between shaft 14 and face surface 22.

Mounted in compressed engagement with bearing surface 30 is elastomeric compressible O-ring 32. O-ring 32 again may be constructed of butadiene acrylonitrile (Buna N) rubber in suitable sizes and dimensions to be utilized in various applications and also may be compressed. In a preferred embodiment of the present invention, O-ring 32 is constructed of a material having a durometer hardness of approximately eighty, although variations in hardness may be appropriate for alternate applications.

O-ring 32 is mounted in engagement with bearing surface 30 and maintained in the depicted engagement by means of flexible floating ring 36. Flexible floating ring 36 is constructed by a resilient flexible material such as polyurethane, neoprene, high carbon rubber of Buna N rubber and preferably exhibits a durometer hardness of approximately ninety or greater. Floating ring 36 is utilized to maintain a compression of approximately nine percent on O-ring 32 and the compression may increase to approximately fourteen percent under loading conditions.

As discussed with reference to FIG. 2, two alternate embodiments of this seal are possible. Flexible floating ring 36 may include an outer surface 38 which is coated with a less hard material exhibiting a durometer hardness of approximately seventy percent to improve the resistance of flexible floating ring 36 to the abrasive character of the material in the well bore. Secondly, flexible floating ring 36 may include at least two surface areas 40 which may be coated with a low coefficient of friction material such as a hard polymerized tetrafluoroethylene plastic. Such a material is marketed under the name Teflon by the E. I. DuPont Company. The coating of flexible floating ring 36 with a low coefficient of friction material will greatly enhance the rotational movement of O-ring 32 and improve the movement of floating ring 36 with respect to bearing surface 42. Those skilled in the art will appreciate, upon reference to this specification, that the utilization of a resilient floating ring as a mounting point for O-ring 32 and the hybrid location of seal 28 will greatly enhance the ability of seal 28 to accommodate radial, axial angular displacements of roller cutter 10 without substantially increasing the ingress of detritus or the egress of lubrication in the bearing area.

Figure 4:
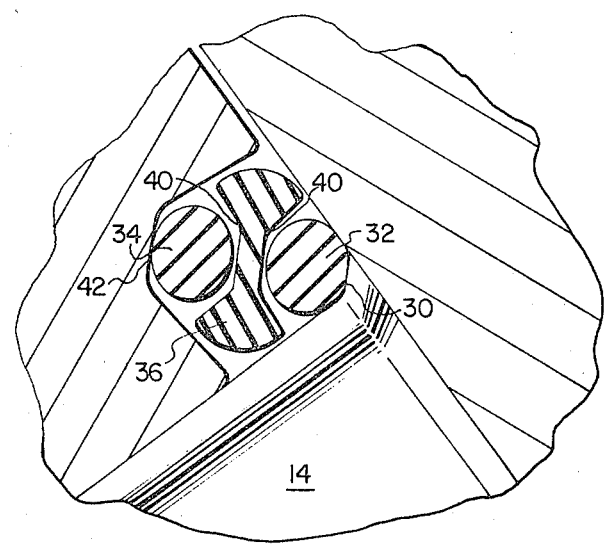
FIG. 4 is a large scale sectional view of a second alternate embodiment of the improved seal of the present invention.

With reference now to FIG. 4, there is depicted a large scale drawing of a second alternate embodiment of seal 28 which is useful in disclosing the construction and operation of this alternate embodiment of the novel seal of the present invention. As before, where possible, the same reference numerals are utilized to describe this embodiment of seal 28.

Seal 28 of FIG. 4 is yet another hybrid form of seal which combines the advantages of "shaft" seals with the advantages of "face" seals. In a manner similar to that depicted in FIG. 2, seal 28 is comprised of a first bearing surface 30 which is formed at the intersection of shaft 14 and face surface 22 and which is disposed circumferentially about the base of shaft 14. A second bearing surface 42 is machined into roller cutter 10 at a point opposing bearing surface 30 so that a line joining bearing surface 30 and bearing surface 42 will substantially bisect the angle between shaft 14 and face surface 22.

Mounted in compressed engagement with bearing surfaces 30 and 42 respectively are elastomeric compressible O-rings 32 and 34. Again, O-rings 32 and 34 may be constructed of butadiene acrylonitrile (Buna A) rubber in suitable sizes and dimensions to be utilized in various applications and may be compressed. As above, in a preferred embodiment of the present invention, O-rings 32 and 34 are constructed of a material having a durometer hardness of approximately eighty, although variations in hardness may be appropriate for alternate applications in either of the rings.

O-rings 32 and 34 are mounted in engagement with bearing surfaces 30 and 42 and maintained in the depicted engagement by means of flexible floating ring 36. Flexible floating ring 36 is constructed of a resilient flexible materials such as polyurethane, neoprene, high carbon rubber of Buna N rubber and preferable exhibits a durometer hardness of approximately ninety or greater. Floating ring 36 is utilized to maintain a compression of approximately nine percent on O-rings 32 and 34 and the compression may increase to approximately fourteen percent under loading conditions.

As can be seen in FIG. 4, the configuration of flexible floating ring 36 in this embodiment differs slightly from that of previously depicted embodiments in that surface areas 40 are both tapered toward bearing surfaces 30 and 42. In this manner, as loading on O-rings 32 and 34 increases, any tendency of O-rings 32 and 34 to move from the depicted position will effectively increase the compression due to the decreased area present between flexible floating ring 36 and each bearing surface. As a result, the more extreme the loading conditions on roller cutter 10, the greater the compression will become and as a consequence, seal 28 will become more effective.

As above, those skilled in the art will appreciate that portions of flexible floating ring 36 may be coated or impregnated with various materials to enhance its ability to utilize the abrasive character of its operating environment and to minimize the friction present between flexible floating ring 36 and O-rings 32 and 34.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is:

1. A rotary seal for utilization with an earth boring drill bit having a drill bit body with a shaft rigidly mounted on a face surface thereof and a rolling cutter rotatably mounted on said shaft, said seal comprising:
   a first bearing surface disposed circumferentially about said shaft;
   a second bearing surface disposed on said rolling cutter;
   a first compressible seal ring having a portion thereof engaged sealingly with first bearing surface;
   a second compressible seal ring having a portion thereof engaged sealingly with said second bearing surface; and
   a flexible floating ring disposed between and in engagement with said first and second compressible seal rings.

2. The rotary seal according to claim 1 wherein said first and second compressible seal rings are constructed of an elastomeric material having a durometer hardness of approximately eighty.

3. The rotary seal according to claim 1 wherein said flexible floating ring is constructed of elastomeric material having a durometer hardness of approximately ninety.

4. The rotary seal according to claim 1 wherein said flexible floating ring is constructed of high carbon rubber.

5. The rotary seal according to claim 3 wherein said flexible floating ring is coated on the outer surface thereof with an elastomeric material having a durometer hardness of approximately 70 whereby said flexible floating ring exhibits better resistance to abrasive materials.

6. The rotary seal according to claim 1 wherein said flexible floating ring is coated at the point of engagement with said first and second compressible seal rings with a low coefficient of friction material.

7. The rotary seal according to claim 6 wherein said low coefficient of friction material comprises a hard polymerized tetrafluoro-ethylene plastic.

8. A rotary seal for utilization with an earth boring drill bit having a drill bit body with a shaft rigidly mounted on a face surface thereof and a rolling cutter rotatably mounted on said shaft, said seal comprising:
- a first bearing surface disposed circumferentially about the base of said shaft at the intersection of said shaft and said face surface;
- a second bearing surface disposed on said rolling cutter;
- a first compressible seal ring having a portion thereof engaged sealingly with first bearing surface;
- a second compressible seal ring having a portion thereof engaged sealingly with said second bearing surface; and
- a flexible floating ring disposed between and in engagement with said first and second compressible seal rings.

9. The rotary seal according to claim 8 wherein said first and second compressible seal rings are constructed of an elastomeric material having a durometer hardness of approximately eighty.

10. The rotary seal according to claim 8 wherein said flexible floating ring is constructed of elastomeric material having a durometer hardness of approximately ninety.

11. The rotary seal according to claim 8 wherein said flexible floating ring is constructed of high carbon rubber.

12. The rotary seal according to claim 10 wherein said flexible floating ring is coated on the outer surface thereof with an elastomeric material having a durometer hardness of approximately 70 whereby said flexible floating ring exhibits better resistance to abrasive materials.

13. The rotary seal according to claim 8 wherein said flexible floating ring is coated at the point of engagement with said first and second compressible seal rings with a low coefficient of friction material.

14. The rotary seal according to claim 13 wherein said low coefficient of friction material comprises a hard polymerized tetrafluoro-ethylene plastic.

15. A rotary seal for utilization with an earth boring drill bit having a drill bit body with a shaft rigidly mounted on a face surface thereof and a rolling cutter rotatably mounted on said shaft, said seal comprising:
- a first bearing surface disposed circumferentially about said shaft;
- a second bearing surface disposed on said rolling cutter;
- a first compressible seal ring having a portion thereof engaged sealingly with first bearing surface;
- a second compressible seal ring having a portion thereof engaged sealingly with said second bearing surface; and
- a flexible floating ring disposed between and in engagement with said first and second compressible seal rings, said flexible floating ring including first surface area tapered toward said first bearing surface.

16. The rotary seal according to claim 15 wherein said flexible floating ring includes a second surface area tapered toward said second bearing surface.

17. The rotary seal according to claim 15 wherein said first and second compressible seal rings are constructed of an elastomeric material having a durometer hardness of approximately eighty.

18. The rotary seal according to claim 15 wherein said flexible floating ring is constructed of elastomeric material having a durometer hardness of approximately ninety.

19. The rotary seal according to claim 15 wherein said flexible floating ring is constructed of high carbon rubber.

20. The rotary seal according to claim 15 wherein said flexible floating ring is coated on the outer surface thereof with an elastomeric material having a durometer hardness of approximately 70 whereby said flexible floating ring exhibits better resistance to abrasive materials.

21. The rotary seal according to claim 15 wherein said flexible floating ring is coated at the point of engagement with said first and second compressible seal rings with a low coefficient of friction material.

22. The rotary seal according to claim 21 wherein said low coefficient of friction material comprises a hard polymerized tetrafluoro-ethylene plastic.

* * * * *

UNITED STATES PATENT AND TRADEMARK OFFICE
CERTIFICATE OF CORRECTION

PATENT NO. : 4,466,621

DATED : August 21, 1984

INVENTOR(S) : Lloyd L. Garner et al.

It is certified that error appears in the above-identified patent and that said Letters Patent is hereby corrected as shown below:

Column 1, line 44, after "cutter" insert --and the cutter--.

Column 3, line 55, "tha" should read --that--.

Column 4, line 67, "by" should read --of--.

Column 5, line 27, after "axial", insert --and--.

Signed and Sealed this

Fifth Day of March 1985

[SEAL]

Attest:

DONALD J. QUIGG

Attesting Officer    Acting Commissioner of Patents and Trademarks